(12) United States Patent
Qiu

(10) Patent No.: US 11,215,289 B1
(45) Date of Patent: Jan. 4, 2022

(54) VALVE CORE ASSEMBLY

(71) Applicant: Chunhe Qiu, Wenzhou (CN)

(72) Inventor: Chunhe Qiu, Wenzhou (CN)

( * ) Notice: Subject to any disclaimer, the term of this patent is extended or adjusted under 35 U.S.C. 154(b) by 0 days.

(21) Appl. No.: 17/225,114

(22) Filed: Apr. 8, 2021

(51) Int. Cl.
*F16K 11/078* (2006.01)
*F16K 27/04* (2006.01)
*G05D 23/13* (2006.01)

(52) U.S. Cl.
CPC ........ *F16K 11/0787* (2013.01); *F16K 27/045* (2013.01); *G05D 23/13* (2013.01); *G05D 23/1313* (2013.01)

(58) Field of Classification Search
CPC ... F16K 11/0787; F16K 27/045; G05D 23/13; G05D 23/1313
See application file for complete search history.

(56) References Cited

U.S. PATENT DOCUMENTS

| | | | | |
|---|---|---|---|---|
| 4,502,507 A * | 3/1985 | Hayman | ............... | F16K 11/074 137/625.17 |
| 4,657,045 A * | 4/1987 | Kitamura | ............ | F16K 11/0787 137/625.17 |
| 4,676,270 A * | 6/1987 | Knapp | ................. | F16K 11/0782 137/270 |
| 4,941,506 A * | 7/1990 | Bergmann | .......... | F16K 11/0787 137/625.4 |
| 4,942,902 A * | 7/1990 | Knapp | ................. | F16K 11/0782 137/270 |
| 4,986,306 A * | 1/1991 | Ferrari | ................ | F16K 11/0787 137/625.17 |
| 5,303,736 A * | 4/1994 | Orlandi | ................. | F16K 47/026 137/625.17 |
| 6,009,893 A * | 1/2000 | Chang | ................. | F16K 11/0785 137/100 |
| 6,237,622 B1 * | 5/2001 | Cook | .................... | F16K 11/074 137/270 |
| 6,805,151 B1 * | 10/2004 | Chang | ................. | F16K 11/0743 137/270 |
| 6,892,761 B2 * | 5/2005 | Chen | ................... | F16K 11/0743 137/625.4 |
| 6,981,693 B1 * | 1/2006 | Chang | ................. | F16K 11/0787 137/603 |
| 7,108,012 B2 * | 9/2006 | Rosko | ................. | F16K 11/0787 137/625.4 |
| 7,134,452 B2 * | 11/2006 | Hiroshi | ............... | F16K 11/0787 137/625.41 |

(Continued)

*Primary Examiner* — Craig M Schneider
*Assistant Examiner* — Christopher D Ballman
(74) *Attorney, Agent, or Firm* — Rumit Ranjit Kanakia

(57) ABSTRACT

The valve core assembly includes a valve housing member, an actuating member, a control plate, a moving plate member, a static plate member, a valve seat member and a sealing member coupled to obtain the valve core assembly. The valve housing member includes a first end portion and a second end portion. The actuating member is rotatably disposed in the valve housing member along the first end portion. The control plate is disposed in the second cavity and coupled to the actuating member. The moving plate member is coupled to the control plate and disposed in the second cavity. The static plate member is disposed adjacent to the moving plate member in the second cavity. The valve seat member is detachably coupled to the valve housing member. Further, the sealing member is removably disposed in a cutout portion of the valve seat member.

19 Claims, 12 Drawing Sheets

(56) References Cited

U.S. PATENT DOCUMENTS

| | | | | |
|---|---|---|---|---|
| 7,174,916 | B2 * | 2/2007 | Chang | F16K 11/0743 137/625.41 |
| 7,185,676 | B2 * | 3/2007 | Huang | F16K 11/0787 137/625.17 |
| 7,487,797 | B2 * | 2/2009 | Di Nunzio | F16K 11/0787 137/625.17 |
| 7,845,574 | B2 * | 12/2010 | Mace | F16K 11/0787 236/12.11 |
| 7,896,025 | B2 * | 3/2011 | Hanson | F16K 31/002 137/454.6 |
| 7,926,508 | B2 * | 4/2011 | Chen | F16K 27/045 137/315.13 |
| 8,109,293 | B2 * | 2/2012 | Tucker | F16K 11/0787 137/625.4 |
| 8,240,326 | B2 * | 8/2012 | Kacik | F16K 11/0787 137/315.12 |
| 8,327,882 | B2 * | 12/2012 | Li | F16K 11/0787 137/625.4 |
| 8,375,974 | B2 * | 2/2013 | Yan | F16K 47/026 137/100 |
| 8,453,669 | B2 * | 6/2013 | Veros | F16K 19/006 137/315.13 |
| 8,490,653 | B2 * | 7/2013 | Chen | F16K 11/0787 137/625.4 |
| 8,640,726 | B2 * | 2/2014 | Tung | F16K 11/044 137/100 |
| 8,695,635 | B1 * | 4/2014 | Wang | F16K 11/0787 137/625.17 |
| 9,249,563 | B2 * | 2/2016 | Yasuhara | E03C 1/0404 |
| 9,267,612 | B2 * | 2/2016 | Chen | F16K 11/0787 |
| 9,441,750 | B2 * | 9/2016 | Huck | F16K 27/045 |
| 9,464,417 | B2 * | 10/2016 | Chen | F16K 11/0787 |
| 9,611,945 | B2 * | 4/2017 | Kemp | F16K 31/605 |
| 9,644,353 | B1 * | 5/2017 | Chang | F16K 27/044 |
| 9,931,606 | B2 * | 4/2018 | Lange | B01F 15/026 |
| 10,167,963 | B1 * | 1/2019 | Chang | F16K 11/0787 |
| 10,533,681 | B2 * | 1/2020 | Chen | F16K 3/08 |
| 10,571,034 | B2 * | 2/2020 | Kim | F16K 11/0743 |
| 10,794,501 | B2 * | 10/2020 | Gili Martinez | F16K 11/14 |
| 10,935,157 | B2 * | 3/2021 | Du | F16K 31/602 |
| 2004/0084097 | A1 * | 5/2004 | Bloom | F16K 11/0782 137/625.17 |
| 2007/0044850 | A1 * | 3/2007 | Pieters | F16K 11/0787 137/597 |
| 2008/0230735 | A1 * | 9/2008 | Cheng | F16K 11/0787 251/359 |
| 2009/0205717 | A1 * | 8/2009 | Yuan | F16K 27/045 137/100 |
| 2012/0012213 | A1 * | 1/2012 | Tedoldi | F16K 11/0787 137/625.4 |
| 2012/0222763 | A1 * | 9/2012 | Yang | F16K 17/34 137/625.4 |
| 2016/0237662 | A1 * | 8/2016 | Chang | F16K 27/045 |
| 2017/0328042 | A1 * | 11/2017 | Tzeng | E03C 1/04 |
| 2018/0059693 | A1 * | 3/2018 | Rodriguez | F16K 11/0743 |
| 2019/0353259 | A1 * | 11/2019 | Cattaneo | F16K 11/074 |
| 2020/0080652 | A1 * | 3/2020 | Ritter | F16K 27/00 |
| 2020/0132200 | A1 * | 4/2020 | Chang | F16K 11/0782 |
| 2021/0017742 | A1 * | 1/2021 | Kobayashi | F16K 11/078 |

\* cited by examiner

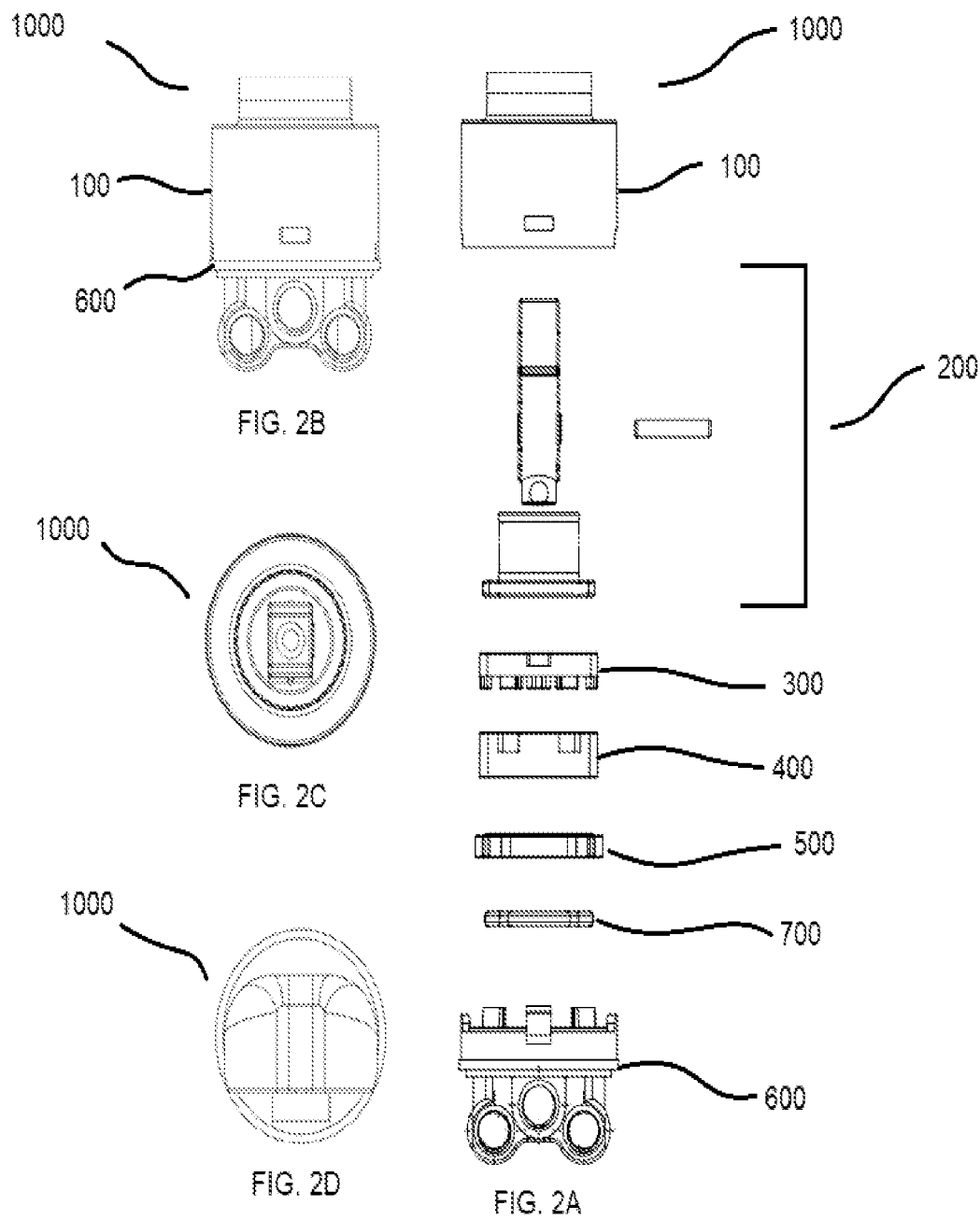

VALVE CORE ASSEMBLY

FIELD OF THE DISCLOSURE

The present disclosure relates to taps, and, more particularly, to a valve core assembly for taps.

BACKGROUND OF THE DISCLOSURE

Valve cores in the taps are configured to regulate water flowing through taps. Generally, valve cores include complex structure of various moving and static elements coupled to each other. Further, the complexity of the overall valve cores increases when the valve cores are for outlet of mixed water supply that are adapted to the intake hot and cold water and mix thereto to output the mixed water. More often than not, during maintenance of such valve cores, disassembling and assembling of such complex valve cores are quite cumbersome and time consuming. Further, due to more parts than required, often, there are probable chance of losing or damaging of one or other parts of conventional valve cores causing leakage in the taps.

Accordingly, there exists a need to overcome shortcomings of the conventional valve cores. For example, there exists a need of a valve core which may be comparatively less in complexity in the overall structure of valve cores. Further, there is need of such valve core which may be simple in structure and involves less structural arrangements. Further, there is need of such valve core which may be easy to assemble and disassemble for maintenance purposes.

SUMMARY OF THE DISCLOSURE

In view of the foregoing disadvantages inherent in the prior art, the general purpose of the present disclosure is to provide a valve core assembly, to include all advantages of the prior art, and to overcome the drawbacks inherent in the prior art.

An object of the present disclosure is to provide a valve core which may be comparatively less in complexity in the overall structure of valve cores.

An object of the present disclosure is to provide a valve core which may be simple in structure and involves less structural arrangements.

Another object of the present disclosure is to provide a valve core which may be easy to assemble and disassemble for maintenance purposes.

In light of the above objects, in one aspect of the present disclosure, valve core assembly is provided. The valve core assembly may include a valve housing member, an actuating member, a control plate, a moving plate member, a static plate member, a valve seat member and a sealing member coupled to obtain the valve core assembly.

In one embodiment, the valve housing member includes a first end portion and a second end portion. The valve housing member includes a seat member separating the first end portion with the second end portion. The valve housing member defines a first cavity and a second cavity, wherein the first cavity is in the first end portion and the second cavity is defined in the second end portion. In one embodiment, the second cavity includes a bigger circumference area than the first cavity.

In one embodiment, the actuating member may be rotatably disposed in the valve housing member. The actuating member may include an actuator sleeve element, an actuator rod element, through holes, and a protruding pin element. The actuator sleeve element may include a sleeve cavity and a sleeve flange. The actuator sleeve element may be rotatably disposed in the first cavity, and the sleeve flange rests on the seat member. Further, the actuator rod element may be disposed in the sleeve cavity. The through holes may be defined along sides of the actuator sleeve element and the actuator rod element. The through holes may be collinearly aligned when the actuator rod element is disposed in the sleeve cavity. Further, the protruding pin element may be engagingly disposed in the through holes to couple the actuator rod element with the sleeve cavity.

In one embodiment, the control plate may be disposed in the second cavity of the valve housing member and coupled to the actuating member. The control plate may include a rod cavity configured on the control plate to receive the actuator rod element to be coupled the control plate with the actuator rod element.

In one embodiment, the moving plate member may be coupled to the control plate and disposed in the second cavity of the valve housing member. The moving plate is adaptable to be rotated or slid by the control plate upon actuation by the actuating member.

In one embodiment, the static plate member may be disposed adjacent to the moving plate member in the second cavity of the valve housing member. The static plate member may include a first water inlet cavity, a second water inlet cavity and a mixed water outlet cavity.

In one embodiment, the valve seat member may be detachably coupled to the valve housing member. The valve seat member may include a first water inlet channel, a second water inlet channel, a mixed water outlet channel, a cutout portion, openings, and flow guiding members. The first water inlet channel may be communicably coupled to the first water inlet cavity. The second water inlet channel may be communicably coupled to the second water inlet cavity. The mixed water outlet channel may be communicably coupled to the mixed water outlet cavity. Further, the cutout portion may be formed along sides of the first and second water inlet channels, and the mixed water outlet channel to guide a flow of water. Further, the openings may be perpendicularly aligned and bend to fluidly coupled to the first and second water inlet channels, and the mixed water outlet channel, respectively. Furthermore, the flow guiding members may be formed along the respective bends between the first water inlet channel and the first threaded openings, and between the second water inlet channel and the second threaded openings, and between the water inlet channel and the third threaded openings. The respective flow guiding members are capable of guiding flow of the water in such as manner to reduce the noise of the flowing water.

In one embodiment, the sealing member may be removably disposed in the cutout portion of the valve seat member. The sealing member may include a complementary first water inlet cavity, a complementary second water inlet cavity and a complementary mixed water outlet cavity to fluidly align with respective the first water inlet cavity, the second water inlet cavity and the mixed water outlet cavity upon being disposed in the cutout portion.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which:

FIG. 2A illustrates an exploded view of the valve core assembly 1000, in accordance with an exemplary embodiment of the present disclosure;

FIG. 2B illustrates a side assembled view of the valve core assembly 1000, in accordance with an exemplary embodiment of the present disclosure;

FIG. 2C illustrates a bottom assembled view of the valve core assembly 1000, in accordance with an exemplary embodiment of the present disclosure;

FIG. 2D illustrates a top assembled view of the valve core assembly 1000, in accordance with an exemplary embodiment of the present disclosure;

Like reference numerals refer to like parts throughout the description of several views of the drawing.

DETAILED DESCRIPTION OF THE DISCLOSURE

The exemplary embodiments described herein detail for illustrative purposes are subject to many variations in implementation. The present disclosure provides a valve core assembly. It should be emphasized, however, that the present disclosure is not limited only to what is disclosed and extends to cover various alternation to valve core assembly. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

Figure 1:
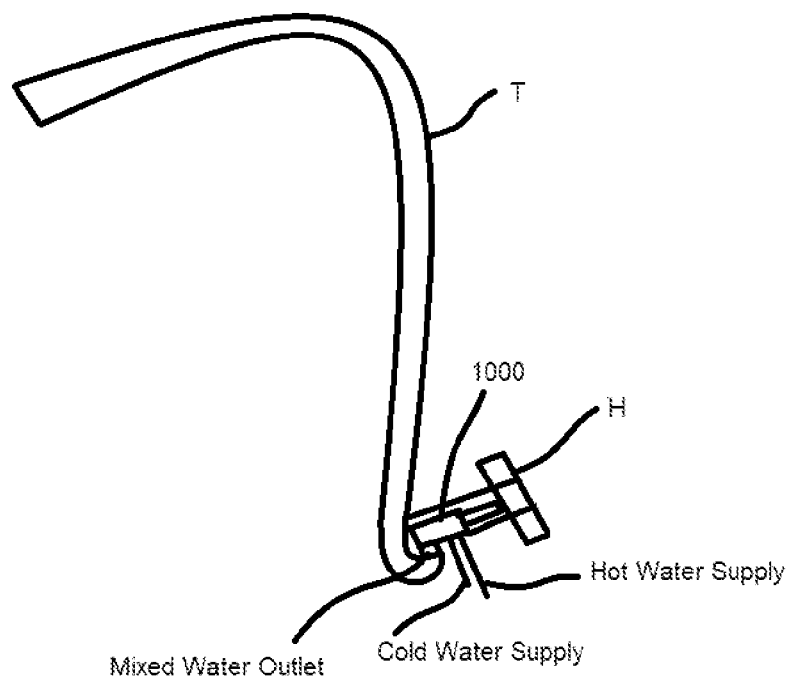
FIG. 1 illustrates an environment, whereby a valve core assembly is shown to be coupled with a tap 'T', in accordance with an exemplary embodiment of the present disclosure.

A valve core assembly 1000 will now be described in conjunction with FIGS. 1 to 17B, in accordance with an exemplary embodiment of the present disclosure. FIG. 1 illustrates an environment, whereby the valve core assembly 1000 is shown to be coupled with the tap 'T'. As seen in FIG. 1, the valve core assembly 1000 is provided. The valve core assembly 1000 may be capable of being coupled horizontally or slantly to the tap 'T'. The valve core assembly 1000 may include a handle 'H' coupled thereto to be actuated or rotated up-and-down or left-and-right to open and close the tap 'T'.

Referring now to FIGS. 2A to 2D, various views of the valve core assembly 1000 are shown. Specifically, FIG. 2A illustrates an exploded view of the valve core assembly 1000, in accordance with an exemplary embodiment of the present disclosure. FIG. 2B illustrates a side assembled view of the valve core assembly 1000, in accordance with an exemplary embodiment of the present disclosure. FIG. 2C illustrates a bottom assembled view of the valve core assembly 1000, in accordance with an exemplary embodiment of the present disclosure. FIG. 2D illustrates a top assembled view of the valve core assembly 1000, in accordance with an exemplary embodiment of the present disclosure. As shown in FIG. 2A, the valve core assembly 1000 includes a valve housing member 100, an actuating member 200, a control plate 300, a moving plate member 400, a static plate member 500, a valve seat member 600 and a sealing member 700 coupled to obtain the valve core assembly 1000.

Figure 3A:
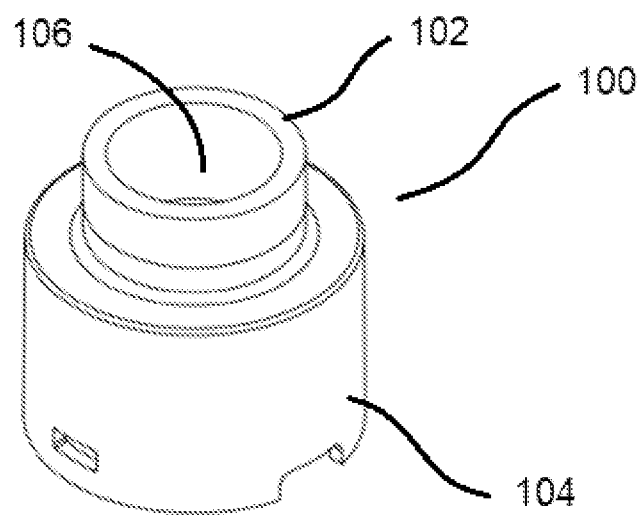
FIGS. 3A and 3B, respectively, illustrate perspective and cross-sectional views of a valve housing member of the valve core assembly of FIGS. 2A to 2D, in accordance with an exemplary embodiment of the present disclosure.
Figure 3B:
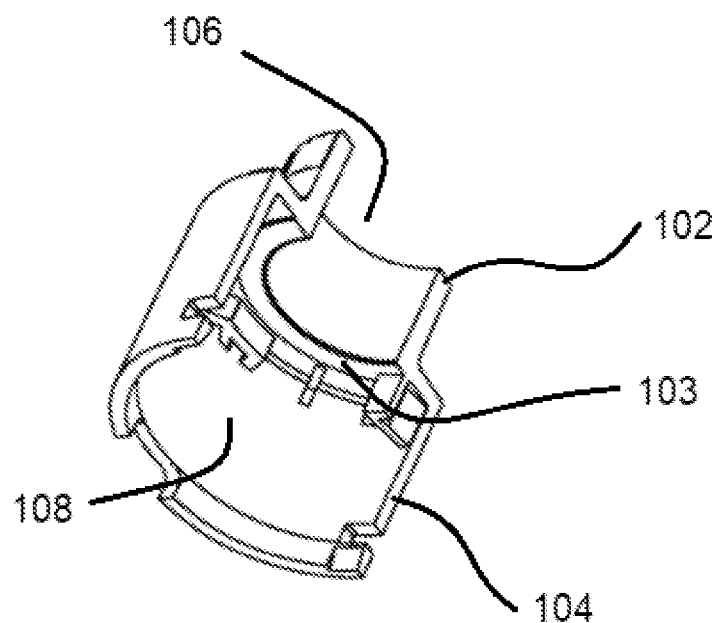

Referring now to FIGS. 3A and 3B, a perspective view and a cross sectional view of the valve housing member 100 are respectively illustrated in accordance with an exemplary embodiment of the present disclosure and will be described in conjunction with FIGS. 2A to 2D. As shown, the valve housing member 100 includes a first end portion 102 and a second end portion 104. The valve housing member 100 includes a seat member 103 separating the first end portion 102 with the second end portion 104. The valve housing member 100 defines a first cavity 106 and a second cavity 108, wherein the first cavity 106 is in the first end portion 102 and the second cavity 108 is defined in the second end portion 104. In one embodiment, the second cavity 108 includes a bigger circumference area than the first cavity 106.

Figure 4A:
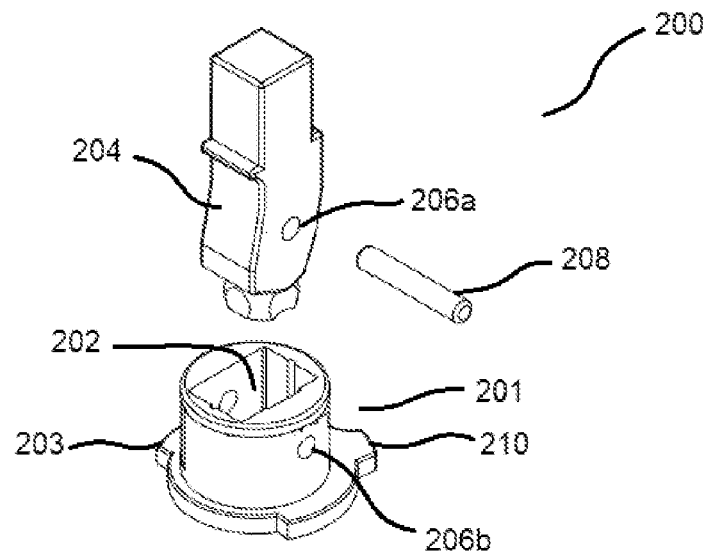
FIGS. 4A and 4B, respectively, illustrates a perspective exploded and a perspective assembled view of an actuating member of the valve core assembly of FIGS. 2A to 2D, in accordance with an exemplary embodiment of the present disclosure.
Figure 4B:
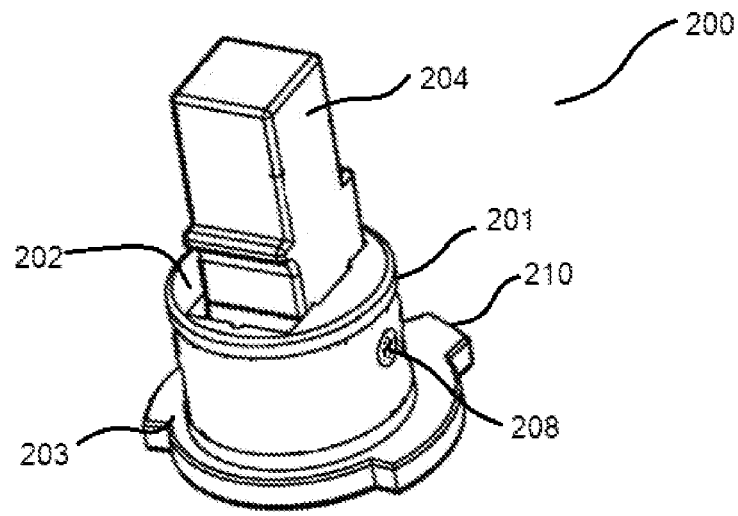

Referring now to FIGS. 4A and 4B, a perspective exploded and a perspective assembled view of the actuating member 200 are respectively illustrated in accordance with an exemplary embodiment of the present disclosure and will be described in conjunction with FIGS. 2A to 3B. The actuating member 200 may be rotatably disposed in the valve housing member 100. The actuating member 200 may include an actuator sleeve element 201, an actuator rod element 204, through holes 206a, 206b, and a protruding pin element 208. The actuator sleeve element 201 may include a sleeve cavity 202 and a sleeve flange 203. The actuator sleeve element 201 may be rotatably disposed in the first cavity 106, and the sleeve flange 203 rests on the seat member 103. Further, the actuator rod element 204 may be disposed in the sleeve cavity 202. The through holes 206a, 206b may be defined along sides of the actuator sleeve element 201 and the actuator rod element 204. The through holes 206a, 206b may be collinearly aligned when the actuator rod element 204 is disposed in the sleeve cavity 202. Further, the protruding pin element 208 may be engagingly disposed in the through holes 206a, 206b to couple the actuator rod element 204 with the sleeve cavity 202.

Figure 5A:
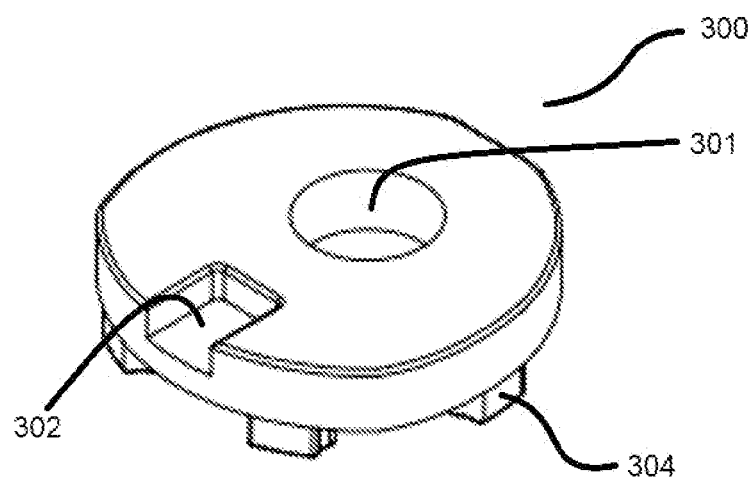
FIGS. 5A and 5B, respectively, illustrate perspective views from upside and downside of a control plate of the valve core assembly of FIGS. 2A to 2D, in accordance with an exemplary embodiment of the present disclosure.
Figure 5B:
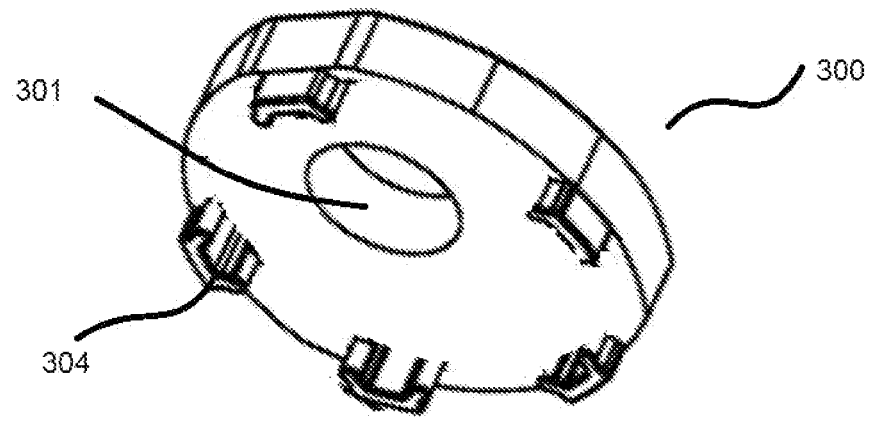

Referring now to FIGS. 5A and 5B, perspective views, of the control plate 300 that are respectively illustrated from upside and downside, in accordance with an exemplary embodiment of the present disclosure and will be described in conjunction with FIGS. 2A to 4B. The control plate 300 may be disposed in the second cavity 108 of the valve housing member 100 and coupled to the actuating member 200. The control plate 300 may include a rod cavity 301 configured on the control plate 300 to receive the actuator rod element 204 to be coupled the control plate 300 with the actuator rod element 204. The control plate 300 may include recess members 304 formed along a circumferential region of the control plate 300. Further, the control plate 300 may also include a groove 302 configured thereon. The recess members 304 and the control plate 300 may be described herein later.

Figure 6A:
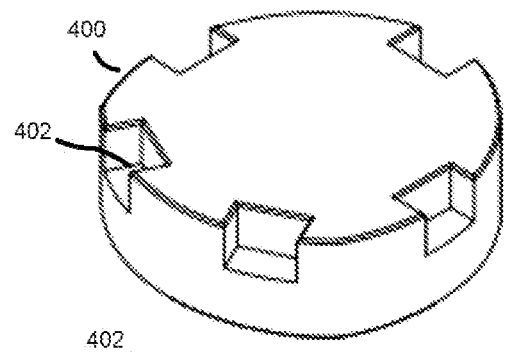
FIGS. 6A and 6B, respectively, illustrate perspective views from upside and downside of a moving plate member of the valve core assembly of FIGS. 2A to 2D, in accordance with an exemplary embodiment of the present disclosure.
Figure 6B:
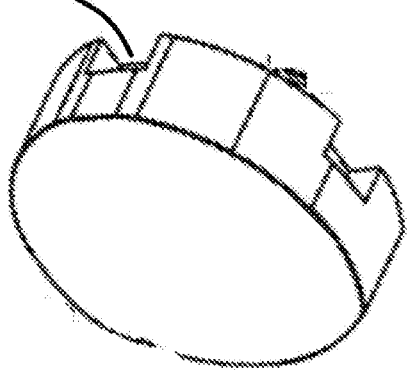

Referring now to FIGS. 6A and 6B, perspective views, of the moving plate member 400 that are respectively illustrated from upside and downside, in accordance with an exemplary embodiment of the present disclosure and will be described in conjunction with FIGS. 2A to 5B. The moving plate member 400 may be coupled to the control plate 300 and disposed in the second cavity 108 of the valve housing member 100. The moving plate 400 is adaptable to be rotated or slid by the control plate 300 upon actuation by the actuating member 200.

Figure 7A:
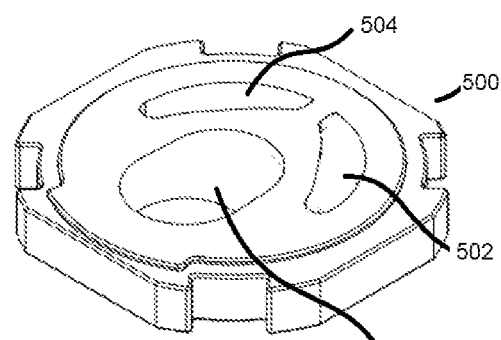
FIGS. 7A and 7B respectively illustrate perspective views from upside and downside of of the valve core assembly of FIGS. 2A to 2D, in accordance with an exemplary embodiment of the present disclosure.
Figure 7B:
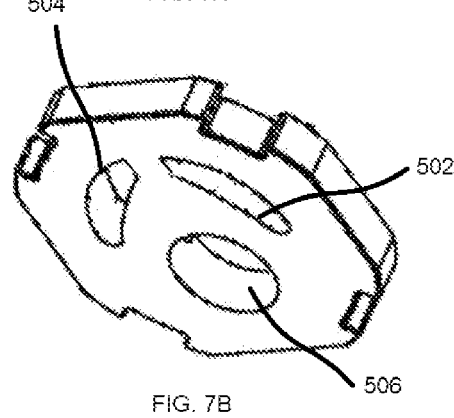

Referring now to FIGS. 7A and 7B, perspective views, of the static plate member 500 that are respectively illustrated from upside and downside, in accordance with an exemplary embodiment of the present disclosure and will be described in conjunction with FIGS. 2A to 6B. The static plate member 500 may be disposed adjacent to the moving plate member 400 in the second cavity 108 of the valve housing member 100. The static plate member 500 may include a first water inlet cavity 502, a second water inlet cavity 504 and a mixed water outlet cavity 506.

Figure 8A:
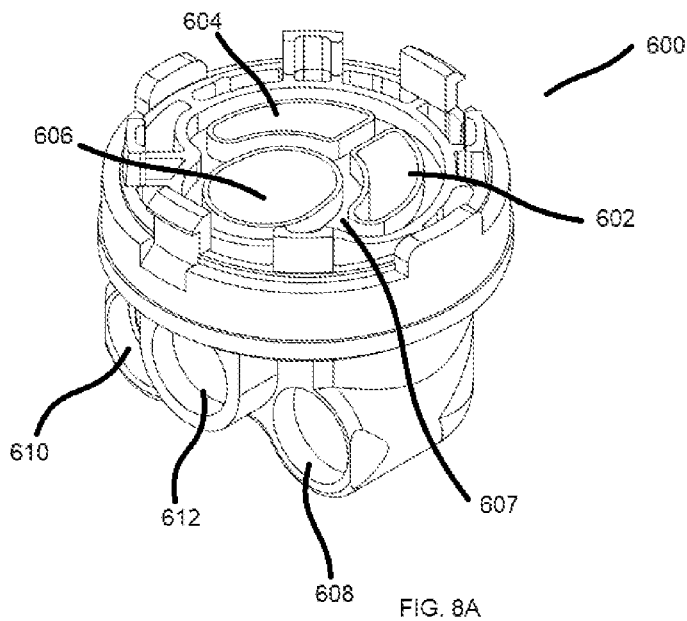
FIGS. 8A and 8B, respectively, illustrate a perspective view and a cross-sectional view of the valve seat member of the valve core assembly of FIGS. 2A to 2D, in accordance with an exemplary embodiment of the present disclosure.
Figure 8B:
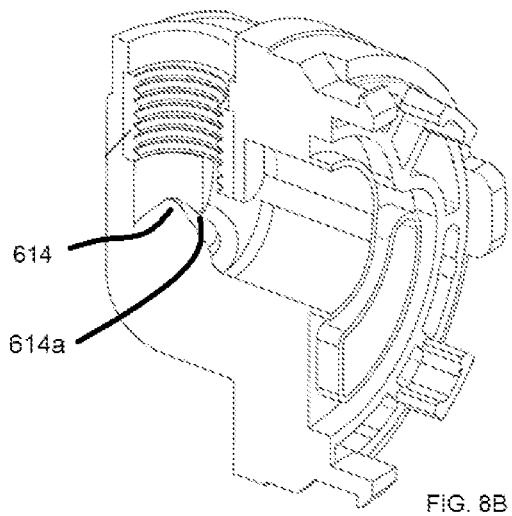

Referring now to FIGS. 8A and 8B, a perspective view and a cross-sectional view of the valve seat member 600 are respectively illustrated in accordance with an exemplary embodiment of the present disclosure and will be described in conjunction with FIGS. 2A to 7B. The valve seat member 600 may be detachably coupled to the valve housing member 100. In one embodiment of the present disclosure, the valve seat member 600 may include a first water inlet channel 602, a second water inlet channel 604, a mixed water outlet channel 606, a cutout portion 607, openings 608, 610, 612, and flow guiding members 614. The first water inlet channel 602 may be communicably coupled to the first water inlet cavity 502. The second water inlet channel 604 may be communicably coupled to the second water inlet cavity 504. The mixed water outlet channel 606 may be communicably coupled to the mixed water outlet cavity 506. Further, the cutout portion 607 may be formed along sides of the first and second water inlet channels 602, 604, and the mixed water outlet channel 606 to guide a flow of water. Further, the openings 608, 610, 612 may be perpendicularly aligned and bend to fluidly coupled to the first and second water inlet channels 602, 604, and the mixed water outlet channel 606, respectively. Furthermore, the flow guiding members 614 may be formed along the respective bends between the first water inlet channel 602 and the first threaded openings 608, and between the second water inlet channel 604 and the second threaded openings 610, and between the mixed water inlet channel 606 and the third threaded openings 612. The respective flow guiding members 614 are capable of guiding flow of the water in such as manner to reduce the noise of the flowing water.

Figure 9:
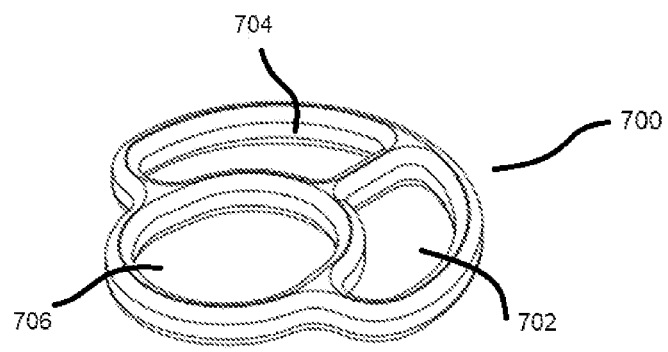
FIG. 9 illustrates a perspective view of the sealing member, in accordance with an exemplary embodiment of the present disclosure.

Referring now to FIG. 9, a perspective view of the sealing member 700 is illustrated in accordance with an exemplary embodiment of the present disclosure and will be described in conjunction with FIGS. 2A to 8B. The sealing member 700 may be removably disposed in the cutout portion 607 of the valve seat member 600. The sealing member 700 may include a complementary first water inlet cavity 702, a complementary second water inlet cavity 704 and a complementary mixed water outlet cavity 706 to fluidly align with respective the first water inlet cavity 502, the second water inlet cavity 504 and the mixed water outlet cavity 506 upon being disposed in the cutout portion 607.

Figure 10:
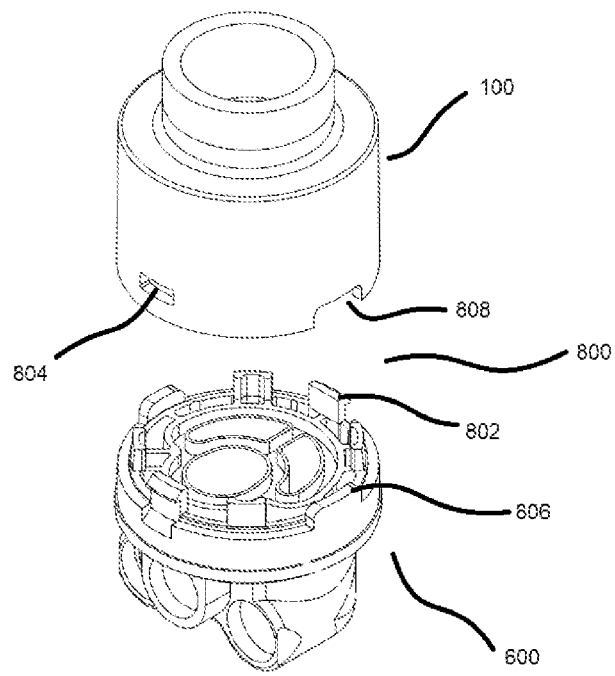
FIG. 10 illustrates an attaching mechanism 800 for coupling of a valve seat member 600 and a valve housing member 100 of the valve core assembly of FIGS. 2A to 2D, in accordance with an exemplary embodiment of the present disclosure.
Figure 11:
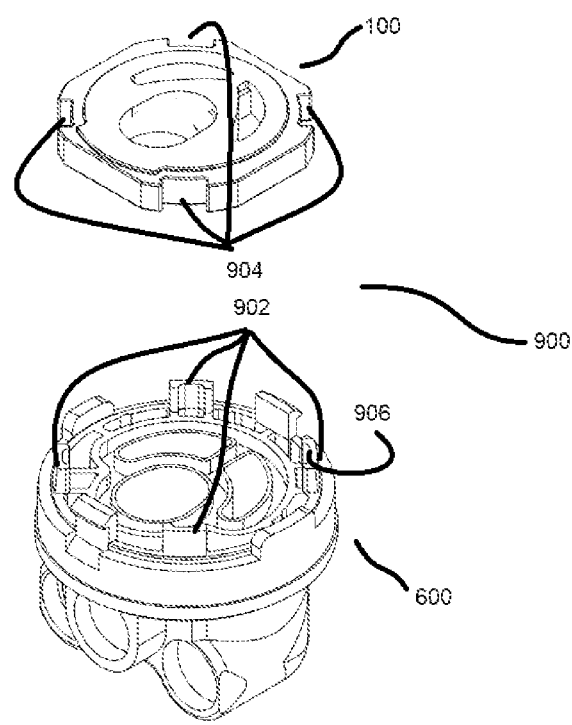
FIG. 11 illustrates an attachment arrangement for coupling a static plate member and a valve seat member of the valve core assembly of FIGS. 2A to 2D, in accordance with an exemplary embodiment of the present disclosure.

In one embodiment of the present disclosure, the valve seat member 600 may be detachably coupled to the valve housing member 100 by an attaching mechanism 800, as shown and described with reference to FIG. 10. The attaching mechanism 800 may include fastening protrusions 802 and complementary fastening grooves 804. The fastening protrusions 802 may extend 180 degrees from an inner region of a circumference of the valve seat member 600. Further, the complementary fastening grooves 804 may be formed along a circumference of the valve housing member 100. The fastening protrusions 802 may be adapted to be received in the complementary fastening grooves 804 to detachably couple the valve seat member 600 with the valve housing member 100. The attaching mechanism 800 may also include complementary extension 806 and slot 808 combination met each other while coupling the valve seat member 600 and the valve housing member 100. Such complementary extension 806 and slot 808 may be respectively formed along the valve seat member 600 and the valve housing member 100, In one embodiment of the present disclosure, the static plate member 500 is detachably coupled to the valve seat member 600 such that when the valve seat member 600 is detachably coupled to the valve housing member 100, the static plate member 500 is positioned in the second cavity 108. The static plate member 500 is detachably coupled to the valve seat member 600 by an attachment arrangement 900, as shown and described with reference to FIG. 11 and will be described in conjunction to FIGS. 1 to 10. In one embodiment of the present disclosure, the attachment arrangement 900 may include attaching protrusions 902 and chamfered regions 904. The attaching protrusions 902 may extend 180 degrees from an outer region of a circumference of the valve seat member 600. Each of the attaching protrusion 902 includes hook-like member 906. Further, the chamfered regions 904 may be formed along edge of the static plate member 500. The attaching protrusions 902 may be adapted to be received in the chamfered regions 904 and each respective hook-like member 906 grip the valve seat member 600 to detachably coupled the static plate member 500 with the valve seat member 600.

Figure 12:
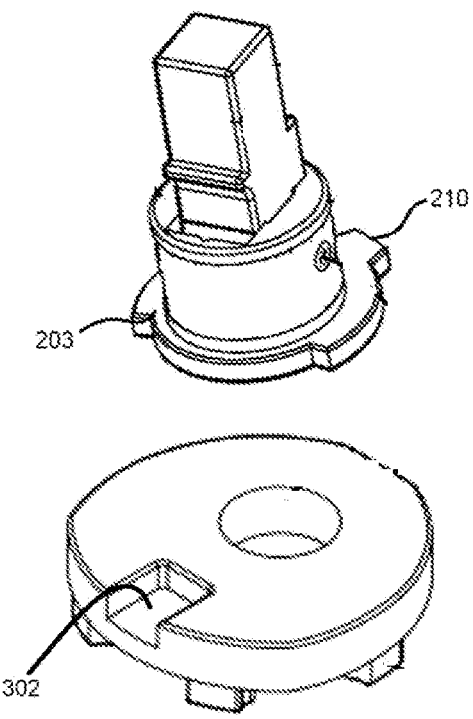
FIG. 12 illustrates a groove and protrusion combination for detachably coupling of a control plate and an actuating member of the valve core assembly of FIGS. 2A to 2D, in accordance with an exemplary embodiment of the present disclosure.

In one embodiment of the present disclosure, the control plate 300 and the actuating member 200 are detachably coupled to each other by a groove and protrusion combination, as shown in FIG. 12. In such an arrangement, the groove 302 may be formed on the control plate 300 and the protrusion 210 may be formed along the sleeve flange 203. The protrusion 210 of the sleeve flange 203 may engage with the groove 302 of the control plate 300 for detachably coupled to each other.

Figure 13:
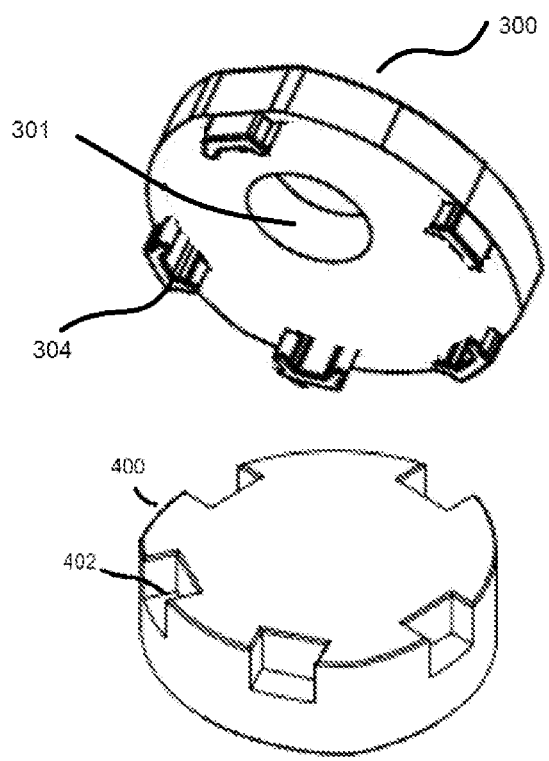
FIG. 13 illustrate a coupling between a moving plate member and a control plate of the valve core assembly of FIGS. 2A to 2D, in accordance with an exemplary embodiment of the present disclosure.

In one embodiment of the present disclosure, as shown in FIG. 13, the moving plate member 400 and the control plate 300 are coupled to each other. The moving plate member 400 may include recess members 402 formed along a circumferential region of the moving plate member 400. Further, the control plate 300 may include complementary extending members 304 extending 180 degrees from a circumferential region of the control plate 300. Such recess members 402 and the complementary extending members 304 are adapted to be detachably engageable to each other to detachably couple the moving plate member 400 and the control plate 300.

In one embodiment of the present disclosure, as shown in FIG. 8B, the flow guiding members 614 includes a tapered projection 614a taperedly extending from a respective circumference of the flow guiding members 614.

Figure 14:
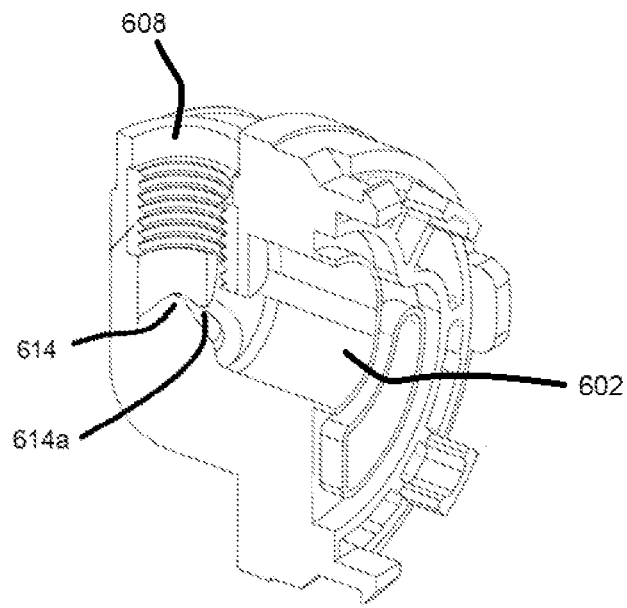
FIG. 14 illustrates configuration of one of the various openings with one of the channels of various channels of the valve core assembly of FIGS. 2A to 2D, in accordance with an exemplary embodiment of the present disclosure.

In one embodiment of the present disclosure, as shown in FIG. 14, the openings 608 (only shown in FIG. 14), 610, 612 are perpendicularly aligned and bend to fluidly coupled to the first and second water inlet channels 602 (only shown in FIG. 14), 604 such that the mixed water outlet channel 606 and respective opening 612 is located between the first water inlet channel 602 and the second water inlet channel 604 and respective opening 608, 610.

Figure 15:
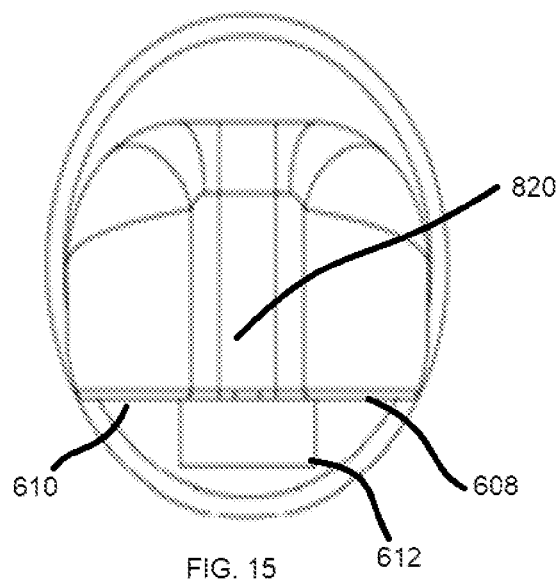
FIG. 15 illustrates a depression between a first water inlet channel and a second water inlet channel and respective opening of the valve core assembly of FIGS. 2A to 2D, in accordance with an exemplary embodiment of the present disclosure.

Further shown in FIG. 14 and also in FIG. 15, in one embodiment, the openings 608 (only shown), 610, 612 are perpendicularly aligned and bend to fluidly coupled to the first and second water inlet channels 602 (only shown), 604 such that the mixed water outlet channel 606 and respective opening 612 is located below in a level with respect to the first water inlet channel 602 and the second water inlet channel 604 and respective opening 608, 610 (seen in FIG. 17A), thereby forming a depression 820 between the first water inlet channel 602 and the second water inlet channel 604 and respective opening 608, 610. In one example embodiment, the mixed water outlet channel 606 and respective opening 612 protrude outward from a surface of the valve seat member 600.

Figure 16:
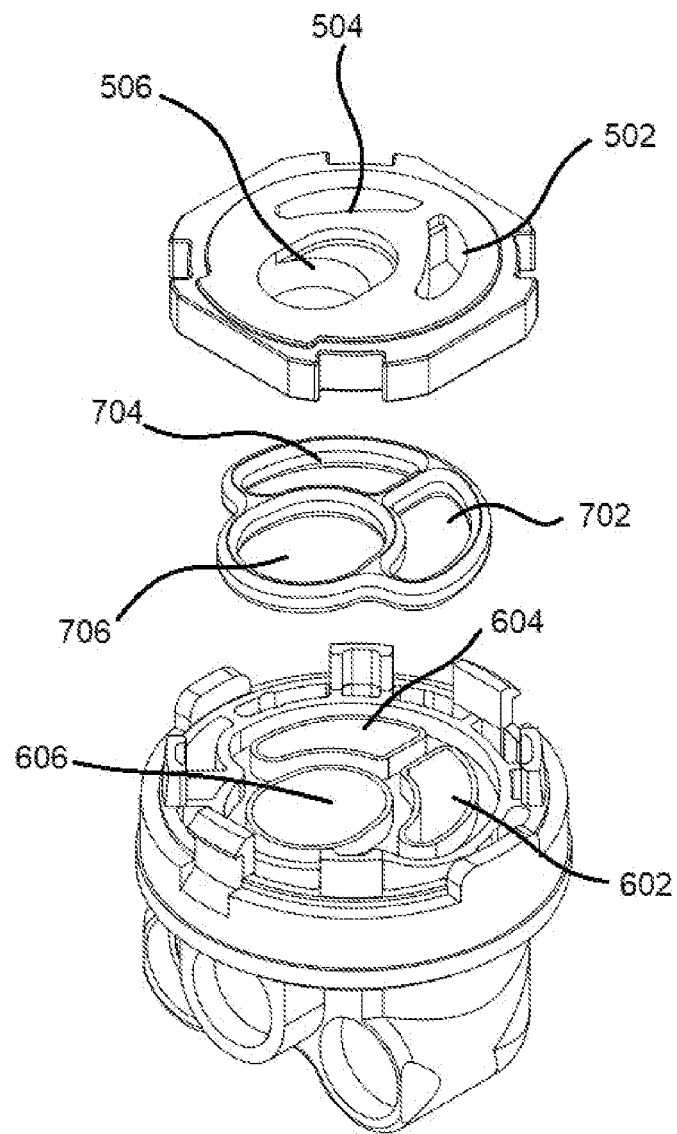
FIG. 16 illustrates colinearly aligned of inlet cavities and channels of the valve core assembly of FIGS. 2A to 2D, in accordance with an exemplary embodiment of the present disclosure.

In one embodiment, as shown in FIG. 16, the second water inlet cavity 504, the second water inlet channel 604, and the complementary second water inlet cavity 704 are colinearly aligned to each other. Further, the first water inlet cavity 502, the first water inlet channel 602, and complementary first water outlet cavity 702 are colinearly aligned to each other. Furthermore, the mixed water outlet cavity 506 communicably coupled to the mixed water out channel 606, and the complementary mixed water outlet cavity 706 are colinearly aligned to each other.

Figure 17A:
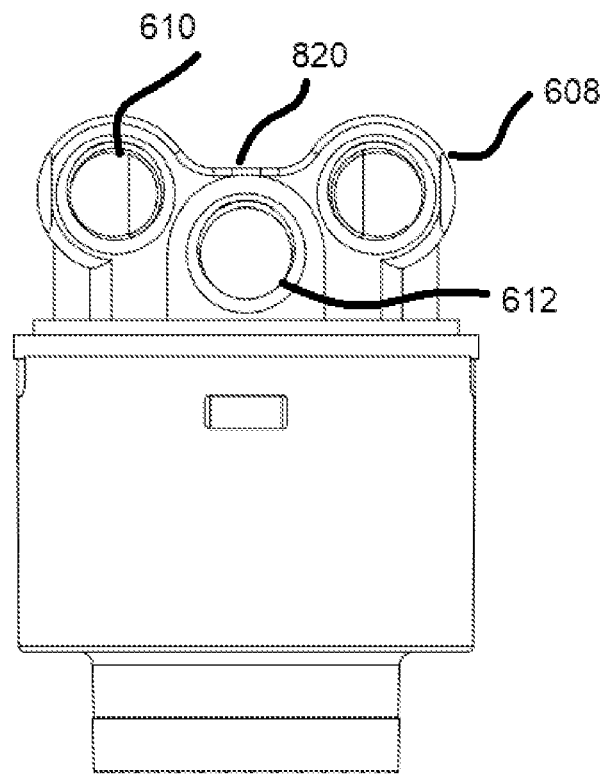
FIGS. 17A and 17B, respectively, illustrates configuration of opening as one-piece structure and as a multi piece structure of the valve core assembly of FIGS. 2A to 2D, in accordance with an exemplary embodiment of the present disclosure.
Figure 17B:
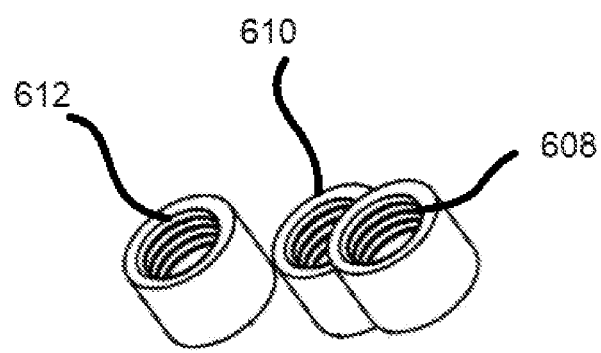

In one embodiment, as shown in FIG. 17A, the openings 608, 610, 612 and the first and second water inlet channels 602, 604 and the mixed water outlet channel 606 are integrally formed as a one-piece structure. the one-piece structure may be injection molded. In another embodiment, as shown in FIG. 17B, the openings 608, 610, 612 and the first and second water inlet channels 602, 604 and the mixed water outlet channel 606 are separately formed as a multi piece structure.

The valve core assembly 1000 as described above may be coupled with the tap 'T' as shown in FIG. 1. As seen in FIG. 1, the valve core assembly 1000 may be capable of being coupled horizontally or slantly to the tap 'T'. The valve core assembly 1000 may include a handle 'H' coupled thereto to be actuated or rotated up-and-down or left-and-right to open and close the tap 'T'. In one embodiment, the valve core assembly 1000 may be aligned downward such that the openings 608, 610, 612 are aligned facing the ground. The opening 608 may be coupled to hot-water supply and the opening 610 may be coupled to the cold-water supply. Further, the opening 612 may be directly coupled to an outlet of the tap 'T. The cold and hot water get mixed within the valve core assembly 1000 and mixed water is outlet from the tap via the opening 612.

The present disclosure is advantageous in providing a valve core, such as the valve core 1000, which may be comparatively less in complexity in the overall structure of valve cores. Further, the valve core may be simple in structure and involves less structural arrangements. Further, the valve core may be easy to assemble and disassemble for maintenance purposes.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. A valve core assembly comprising:
   (i) a valve housing member having, a first end portion and a second end portion,
      a seat member separating the first end portion with the second end portion,
      a first cavity defined in the first end portion,
      a second cavity defined in the second end portion, wherein the second cavity has a bigger circumference area than the first cavity;
   (ii) an actuating member rotatably disposed in the valve housing member, the actuating member having,
      an actuator sleeve element having a sleeve cavity and a sleeve flange, the actuator sleeve element is rotatably disposed in the first cavity, and the sleeve flange rests on the seat member,
      an actuator rod element disposed in the sleeve cavity,
      through holes defined along sides of the actuator sleeve element and the actuator rod element, wherein the through holes are collinearly aligned when the actuator rod element is disposed in the sleeve cavity,
      a protruding pin element engagingly disposed in the through holes to couple the actuator rod element with the sleeve cavity;
   (iii) a control plate disposed in the second cavity of the valve housing member and coupled to the actuating member, the control plate having,
      a rod cavity configured on the control plate to receive the actuator rod element to be coupled the control plate with the actuator rod element;
   (iv) a moving plate member coupled to the control plate and disposed in the second cavity of the valve housing member, wherein the moving plate is adaptable to be rotated or slid by the control plate upon actuation by the actuating member;
   (v) a static plate member disposed adjacent to the moving plate member in the second cavity of the valve housing member, the static plate member having a first water inlet cavity, a second water inlet cavity and a mixed water outlet cavity;
   (vi) a valve seat member detachably coupled to the valve housing member, the valve seat member having,
      a first water inlet channel communicably coupled to the first water inlet cavity,
      a second water inlet channel communicably coupled to the second water inlet cavity,
      a mixed water outlet channel communicably coupled to the mixed water outlet cavity,
      a cutout portion formed along sides of the first and second water inlet channels, and the mixed water outlet channel to guide a flow of water,
      openings perpendicularly aligned and bend to fluidly coupled to the first and second water inlet channels, and the mixed water outlet channel, respectively, the openings comprising a first threaded opening, a second threaded opening, and a third threaded opening,
   flow guiding members formed along the respective bends between the first water inlet channel and the first threaded openings, and between the second water inlet channel and the second threaded openings, and between the mixed water outlet channel and the third threaded openings, wherein the flow guiding members having a tapered projection taperedly extending from a respective circumference of the flow guiding members and pointing towards the openings such that a tip of the tapered projection terminates at ends of the openings or at a last thread of the respective first, second, and third openings;
   (vii) a sealing member removably disposed in the cutout portion of the valve seat member, the sealing member having a complementary first water inlet cavity, a complementary second water inlet cavity and a complementary mixed water outlet cavity to fluidly align with respective the first water inlet cavity, the second water inlet cavity and the mixed water outlet cavity upon being disposed in the cutout portion.

2. The valve core assembly of claim 1, wherein the valve seat member is detachably coupled to the valve housing member by an attaching mechanism.

3. The valve core assembly of claim 2, wherein the attaching mechanism comprises:
   fastening protrusions extending 180 degrees from an inner region of a circumference of the valve seat member; and
   complementary fastening grooves formed along a circumference of the valve housing member, wherein the fastening protrusions is adapted to be received in the complementary fastening grooves to detachably couple the valve seat member with the valve housing member.

4. The valve core assembly of claim 1, wherein the static plate member is detachably coupled to the valve seat member such that when the valve seat member is detachably coupled to the valve housing member, the static plate member is positioned in the second cavity.

5. The valve core assembly of claim 4, wherein the static plate member is detachably coupled to the valve seat member by an attachment arrangement.

6. The valve core assembly of claim 5, wherein the attachment arrangement comprises:
   attaching protrusions extending 180 degrees from an outer region of a circumference of the valve seat member, each of the attaching protrusion includes hook-like member; and
   chamfered regions formed along edge of the static plate member, wherein the attaching protrusions adapted to be received in the chamfered regions and each respective hook-like member grip the valve seat member to detachably coupled the static plate member with the valve seat member.

7. The valve core assembly of claim 1, wherein the control plate and the actuating member are detachably coupled to each other by a groove and protrusion combination, wherein a groove is formed on the control plate and a protrusion is formed along the sleeve flange.

8. The valve core assembly of claim 1, wherein the moving plate member comprises recess members formed on a circumferential region of the moving plate member.

9. The valve core assembly of claim 8, wherein the control plate comprises complementary extending members extending 180 degrees from a circumferential region of the control plate.

10. The valve core assembly of claim 9, wherein the recess members and the complementary extending members are adapted to be detachably engageable to each other to couple the moving plate member and the control plate.

11. The valve core assembly of claim 1, wherein the openings perpendicularly aligned and bend to fluidly coupled to the first and second water inlet channels such that the mixed water outlet channel and respective opening is located between the first water inlet channel and the second water inlet channel and respective opening.

12. The valve core assembly of claim 1, wherein the openings perpendicularly aligned and bend to fluidly coupled to the first and second water inlet channels such that the mixed water outlet channel and respective opening is located below in a level with respect to the first water inlet channel and the second water inlet channel and respective opening, thereby forming a depression between the first water inlet channel and the second water inlet channel and respective opening.

13. The valve core assembly of claim 1, wherein the mixed water outlet channel and respective opening protrude outward from a surface of the valve seat member.

14. The valve core assembly of claim 1, wherein: the second water inlet cavity, the second water inlet channel, and the complementary second water inlet cavity are colinearly aligned to each other.

15. The valve core assembly of claim 14, wherein: the first water inlet cavity, the first water inlet channel, and the complementary first water inlet cavity are collinearly aligned to each other.

16. The valve core assembly of claim 15, wherein: the mixed water outlet cavity communicably coupled to the mixed water outlet cavity, and the complementary mixed water outlet cavity are colinearly aligned to each other.

17. The valve core assembly of claim 1, wherein the openings and the first and second water inlet channels and the mixed water outlet channel are integrally formed as a one-piece structure.

18. The valve core assembly of claim 17, wherein the one-piece structure is injection molded.

19. The valve core assembly of claim 1, wherein the openings and the first and second water inlet channels and the mixed water outlet channel are separately formed as a multi piece structure.

\* \* \* \* \*